United States Patent

[11] 3,630,756

[72] Inventors Ross Alexander Smith
7 Orme Ct., London, W. 2.;
John Alexander Francis Woods, 24
Dennington Park Road, Kilburn, N.W. 6.,
London, both of England formerly of 28
Collington Ave., Bexhill-on-Sea, Sussex,
England
[21] Appl. No. 20,840
[22] Filed Mar. 18, 1970
[45] Patented Dec. 28, 1971

[54] VINEGAR-TYPE FLAVOR COMPOSITION
8 Claims, No Drawings
[52] U.S. Cl. .................................................. 99/140 R,
99/144, 99/147
[51] Int. Cl. ...................................................... A23l 1/26
[50] Field of Search ........................................... 99/140 R,
147

[56] References Cited
UNITED STATES PATENTS
3,002,896 10/1961 Buck ............................ 99/147
3,445,244 5/1969 Noznick ...................... 99/147
FOREIGN PATENTS
1,001,171 10/1951 France ......................... 99/147

*Primary Examiner*—Morris O. Wolk
*Assistant Examiner*—Sidney Marantz
*Attorney*—Herbert H. Goodman ABSTRACT: A solid flavor composition of vinegar-type is provided by absorbing a still residue resulting from the distillation of vinegar from a double fermentation vinegar liquor (hitherto believed to be of no commercial value) in a nontoxic substantially water-insoluble substrate, preferably amorphous silica gel. The composition finds use in powdered comestible products akin to tomato or Worcester sauce.

VINEGAR-TYPE FLAVOR COMPOSITION

The invention relates to novel flavor compositions and more particularly to a solid composition providing a flavor akin to that of vinegar.

Vinegar is a traditional liquid condiment which has been produced by a double fermentation process of a suitable cereal vegetable or fruit. The first fermentation is a normal alcoholic fermentation. The alcohol thus produced is then converted to acetic acid by the action of *acetobacter*. If no further purification of the fermentation liquid is carried out, the product is pale straw color and contains 4.5–7.5 percent by weight of acid (calculated as acetic acid). However, the fermentation liquid is often distilled to produce a water-white distillate containing about 5 percent by weight of acid which is known as white or distilled vinegar. Sometimes the alcohol from the first fermentation is distilled off to give a more concentrated alcohol solution which is then fermented with *acetobacter* to yield spirit vinegar containing 9–12 percent of acid (calculated as acetic acid) depending on the alcohol content of the original distillate. Vinegar may also be classified according to the fermentable material employed for its production, e.g. cider vinegar, wine vinegar, citrus vinegar, malt vinegar, etc.

When the crude acid double-fermentation liquor is distilled to produce distilled vinegar, there remains a still residue, which is sometimes known as vinegar lees or still bottoms. This residue consists of acetic acid, water and appreciable quantities of oleo resins and similar substances. Hitherto such still residue has usually been discarded as being of no commercial value, particularly since the oleoresins contained therein will have been subjected to heat degradation, that is caramelization, during the distillation. We have now found that the still residues from vinegar distillation having an acidity of 10–20 percent and a solids content of at least 25 percent by weight can be used to produce powdered flavor compositions of vinegar-type by absorbing them on nontoxic substrates that are substantially water-insoluble.

Accordingly, the invention provides a solid flavor composition of vinegar-type which comprises a nontoxic substantially water-insoluble substrate having absorbed therein a still residue resulting from the distillation of vinegar from a double-fermentation vinegar liquor, said residue having an acidity of 10–20 percent by weight (calculated as acetic acid) and a solids content of at least 25 percent by weight.

If the still residue is that remaining after distillation of vinegar therefrom has been completed, it will normally have a solids content of at least 65 percent, often of 70–80 percent, and an acidity of about 18 percent. However, in view of the caramelization which such a residue has undergone, it is preferred for present purposes to employ a lees that has resulted from a premature termination of the distillation of the double-fermentation liquor at atmospheric pressure and having a solids content of 25–45 percent by weight followed by further concentration of the lees to a solids content of 70–80 percent and an acidity of about 18 percent by distillation of vinegar therefrom at a pressure of less than 80 mm. mercury. A vinegar lees of 25–45 percent solids content, especially 30–40 percent by weight, can nevertheless be used and this may be obtained by premature termination of the distillation of a double-fermentation vinegar liquor, or less preferably by the addition of water or acetic acid to a more concentrated residue. Alternatively, the said residue for present use can be obtained by taking the above-described residue of low-solids content and removing water therefrom by a process of reverse osmosis or freeze concentration. Preferably the water content of the still residue for present use is below 25 percent by weight of the weight of the still residue. While the acidity of the residue employed may be between 10 and 20 percent, it is preferred to employ a residue with an acidity of about 18 percent. The fermentation liquid from which the said still residues are obtained for present use may be derived from any vegetable or fruit from which vinegar may be obtained after the conventional double fermentation, but very good results are obtained when a malt barley is employed for this purpose.

The absorbent substrate is nontoxic, has a low or negligible water-solubility, and is usually in finely divided form. Suitable substrates include:—silica and silicic acid; sodium, aluminum and calcium silicates including kaolin, sepiolite, and bentonite; alumina; magnesium oxide, silicate, carbonate or stearate; calcium phosphates and sodium pyrophosphate. The preferred substrates are silica and the silicates, particularly the micron-sized amorphous silica gels. It is preferred that the substrate has a high surface area/mass ratio and that it has a high degree of absorbency. Mixtures of substrates may be employed and this may sometimes be advantageous when a substrate of high absorbency is used, but which is not entirely tasteless. For example we have found a mixture containing 50–75 percent of silica and 25–50 percent of a sodium aluminum silicate can often be used with advantage. The presence of amorphous silica also seems to assist the formation of the present compositions in the form of free-flowing granules. Thus it is preferred that the substrates for present use include at least 5 percent by weight of amorphous silica. Small amounts of water-soluble materials may also be present, provided they do not adversely affect the essential solid nature of the flavor composition of the invention.

The amount of the residue absorbed on the substrate may be varied according to the use desired of the flavor composition of the invention. It is, however, usually preferred to produce a flavor of substantially maximum concentration according to the absorbency of the substrate. A concentration of 75 percent of the residue (based on the total weight of residue and substrate) has been achieved with a silica substrate which is an amorphous gel having high absorbency towards liquids. The preferred compositions of the invention comprise at least 50 percent by weight of the said residue, based on the weight of residue and substrate.

The present compositions may be prepared by simple mixing until the residue has been completely absorbed by the substrate and a granular composition results which can then be ground or agglomerated to the particle size desired for the composition. Preferably, the finely powdered substrate is added to the residue with agitation. A sticky and lumpy mass often then results and this is gently ground or milled to the desired particle size. If desired, further substrate may be incorporated in the composition at this stage, particularly if there is difficulty in obtaining the product in the form of free-flowing granules. Excessive grinding pressure is depreciated since with silica substrates this may lead to the production of a jellylike mass which is much more difficult to reduce to granular form. Gentle heating during mixing usually assists in preventing the formation of a sticky or lumpy mass so that a product of the desired granular nature may be obtained.

It is, moreover, often preferred to include an oil-miscible diluent with the residue and substrate in the compositions of the invention since this also aids the intimate blending of the ingredients. Such diluents are employed in an amount up to 35 percent by weight of the total compositions. Suitable diluents include vegetable oils, glycerol, triacetin, diacetin and propylene glycol. The diluent or mixing aid must, of course, be both palatable and nontoxic. The preferred mixing aid is propylene glycol. The mixing aid is preferably first mixed with the residue and the mixture heated gently and stirred until a product of smooth creamlike consistency is obtained. The substrate is then added to this product and the mixture agitated until a fine granular product of desired particle size is obtained. The compositions of the invention obtained in this way can contain up to 50 percent by weight of the residue.

The compositions of the invention may be used as such in a wide range of comestible products where a flavor of vinegar-type is required. They are particularly suitable, because of their dry nature, as an ingredient of dried foods such as packaged soups and powdered sauces such as mint sauce, or Worcester sauce. They can also be used in the manufacture of pickles or added to frozen foods such as frozen fish fillets or fish sticks. The flavor compositions of the invention are preferably included in comestible products in an amount such that the said nontoxic substantially water-insoluble substrate does not exceed 8 percent by weight of the said comestible product.

If desired, the powdered compositions can be mixed with other seasoning or flavor agents to produce a combined flavor and such combined flavors can then be incorporated in, or employed in conjunction with, comestible products. Such other agents can be incorporated into the present compositions during the preparation thereof, for example by premixing of such agents with the said residue and/or the substrate that is to be employed. A particular example of a combined flavor of this type is a salt and vinegar-type flavor obtained by mixing the composition of the invention with salt, preferably employing the salt in from 1–10 parts by weight per part of the vinegar-type flavor. Alternatively the salt may be premixed with the substrate before this is mixed with the lees. Such a mixture with salt finds particular use for coating the surfaces of potato crisps, dried fried potatoes or similar products. A small amount of sweetening agent, citric acid and/or other flavor agents may also be included in the flavor compositions of the invention when desired. If it is desired to increase the bulk of the flavor compositions an inert filler, such as flour, maltodextrins and/or whey powder, can be added.

The invention is illustrated by the following examples in which quantities are expressed on a weight basis unless otherwise specified:

EXAMPLE 1

A malt vinegar containing 4.0–7.5 percent of acid (calculated as acetic acid) was distilled to produce distilled vinegar and the distillation was stopped when the still residue had an acidity of 14 percent and a solids content of 36 percent. To 20 parts of this residue there was stirred in amorphous silica gel (5 parts) followed by a sodium aluminum silicate (3 parts). The mixture was then gently ground until the product was obtained in the form of free-flowing granules. These contained 28 percent by weight of the substrate and 72 percent of the still residue and were found to be satisfactory as giving an authentic vinegar flavor.

EXAMPLE 2

Substantially equivalent results were obtained when example 1 was repeated but with first carrying out a further distillation of the still residue of example 1 at a reduced pressure of less than 80 mm. of mercury to give a final still residue having an acidity of 18 percent (measured as acetic acid) and a solids content of 75 percent. Part of this final residue was then taken and treated as was the residue in example 1.

EXAMPLE 3

To the residue used in example 1 (10 parts) there was added with stirring a finely divided calcium silicate (9 parts). Gentle grinding reduced the mixture to a slightly sticky powder which became free-flowing after the addition of amorphous silica gel (1 part). The resulting composition gave an acceptable flavor of vinegar-type.

EXAMPLE 4

A malt vinegar was distilled at atmospheric pressure until the residue had a solids content of about 30 percent and then as in example 2 until the solids content of the residue had increased to about 75 percent. This residue (48 parts) was then blended under gentle heat with propylene glycol (24 parts) until a smooth creamy emulsion was obtained. Silica gel (28 parts) was then stirred into the resulting emulsion to give a granular composition which was free-flowing and had a flavor of authentic vinegar-type.

EXAMPLE 5

The powdered flavor composition of example 4 (8 parts) was mixed with salt (40 parts), sucrose (15 parts), citric acid (5 parts), maltodextrins (22 parts) and whey powder (10 parts). The water content of the resulting composition did not exceed 1 percent by weight of the total weight of the composition. This combined flavor composition was used to coat potato crisps to give them a flavor of authentic salt and vinegar type.

EXAMPLE 6

A powdered tomato sauce flavor was obtained by blending the vinegar-type flavor composition of example 1 (18 parts) with salt (25 parts), tomato powder (35 parts), tartaric acid (5 parts), sucrose (16 parts) and mixed herbs/spice (1 part). This could be used as such or after mixing to a paste with water.

EXAMPLE 7

Other acceptable tomato sauce flavors were obtained by blending the following ingredients in the stated amounts:

|  | Composition A (parts by weight) | Composition B (parts by weight) |
| --- | --- | --- |
| Still residue as prepared in Example 2 | 7 | — |
| Flavor composition prepared as in Example 4 | — | 12 |
| Sucrose | 19 | 20 |
| Salt | 25 | 23 |
| Tartaric acid | 2 | 1 |
| Tomato powder | 45 | 44 |
| Silica gel | 2 | — |
|  | 100 | 100 |

EXAMPLE 8

Powdered Worcester sauce was obtained by blending a proprietary mixture (17.5 parts) of spice and herbs designed for use in Worcester sauce with the powdered flavor composition of example 1 (46.5 parts), caramel powder (8 parts) sucrose (8 parts), dehydrated tomato powder (16.5 parts) and citric acid (3.5 parts). The mixture could be used as such but the accepted consistency of Worcester sauce is obtained after mixing the mixture with three times its weight of water.

EXAMPLE 9

A further very acceptable powdered Worcester sauce flavor formulation was obtained by blending the following ingredients in the stated amounts:

|  | Parts by weight |
| --- | --- |
| Flavor composition prepared as in Example 4 | 24 |
| Tomato powder | 16 |
| Caramel powder | 9 |
| Citric acid | 3.5 |
| Sucrose | 8 |
| Spice/herb mixture | 17.5 |
| Flour | 22 |
|  | 100.0 |

We claim:

1. A solid flavor composition of vinegar-type which comprises a nontoxic substantially water-insoluble substrate having absorbed therein a still residue resulting from the distillation of vinegar from a double-fermentation vinegar liquor, said residue having an acidity of 10–20 percent by weight (calculated as acetic acid) and a solids content of at least 25 percent by weight.

2. A composition according to claim 1 wherein the said substrate is substantially an amorphous silica gel.

3. A composition according to claim 1 wherein the weight of said residue absorbed in the said substrate is greater than the weight of the substrate.

4. A powdered comestible product comprising salt and a flavor composition as claimed in claim 1 in an amount such that the said substrate does not exceed 8 percent of the total weight of the said comestible product.

5. A powdered comestible product comprising tomato powder and a flavor composition as claimed in claim 1 in an amount such that the said substrate does not exceed 8 percent of the total weight of the said comestible product.

6. A composition according to claim 1 wherein the said still residue employed has a solids content of at least 65 percent by weight.

7. A composition according to claim 6 wherein the said residue of solids content of at least 65 percent by weight has been obtained by distillation of a double-fermentation vinegar liquor to a solids content of 25–45 percent by weight followed by further removal of water therefrom by distillation at a pressure of less than 80 mm. of mercury.

8. A composition according to claim 6 wherein the said still residue employed has a concentration of water of less than 25 percent by weight thereof.

* * * * *

UNITED STATES PATENT OFFICE
CERTIFICATE OF CORRECTION

Patent No. 3,630,756              Dated December 28, 1971

Inventor(s) Ross Alexander Smith and John Alexander Francis Woods

It is certified that error appears in the above-identified patent and that said Letters Patent are hereby corrected as shown below:

Title page, left column, insert

--[32]  Priority      April 3, 1969
  [33]                Great Britain
  [31]                17662/69--

Column 4, line 28, the numeral "19" which appears after "Sucrose" should appear further to the right under "Composition A".

Signed and sealed this 11th day of July 1972.

(SEAL)
Attest:

EDWARD M. FLETCHER, JR.            ROBERT GOTTSCHALK
Attesting Officer                  Commissioner of Patents